United States Patent
Akhtar

(10) Patent No.: US 8,553,647 B2
(45) Date of Patent: Oct. 8, 2013

(54) OPTIMIZATION OF NON-OPTIMIZED HANDOFF FROM A FIRST ACCESS TECHNOLOGY TO A SECOND ACCESS TECHNOLOGY

(75) Inventor: Haseeb Akhtar, Garland, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 662 days.

(21) Appl. No.: 12/772,456

(22) Filed: May 3, 2010

(65) Prior Publication Data

US 2011/0182268 A1 Jul. 28, 2011

Related U.S. Application Data

(60) Provisional application No. 61/297,443, filed on Jan. 22, 2010.

(51) Int. Cl.
*H04Q 7/00* (2006.01)

(52) U.S. Cl.
USPC .......................................... 370/331

(58) Field of Classification Search
None
See application file for complete search history.

(56) References Cited

U.S. PATENT DOCUMENTS

| | | | | |
|---|---|---|---|---|
| 8,027,306 B2 * | 9/2011 | Sun et al. | ....................... | 370/331 |
| 2003/0142629 A1 * | 7/2003 | Krishnamurthi et al. | ..... | 370/249 |
| 2005/0169295 A1 * | 8/2005 | Yun et al. | ....................... | 370/437 |
| 2005/0288047 A1 * | 12/2005 | Ananthanarayanan et al. | ............................. | 455/518 |
| 2006/0046661 A1 * | 3/2006 | Ekvetchavit et al. | ....... | 455/67.11 |
| 2006/0153134 A1 * | 7/2006 | Lee et al. | ....................... | 370/331 |
| 2007/0133476 A1 * | 6/2007 | Li et al. | ......................... | 370/335 |
| 2007/0153728 A1 * | 7/2007 | Le et al. | ......................... | 370/329 |
| 2007/0238442 A1 * | 10/2007 | Mate et al. | ...................... | 455/403 |

OTHER PUBLICATIONS

3GPP2 E-UTRAN—eHRPD Connectivity and Interworking: Core Network Aspects. X.S0057-0 V2.0. Dec. 2009.
3GPP2. CDMA2000 High Rate Packet Data Air Interface Specification. C.S0024-A V2.0. Oct. 27, 2000.
3GPP2. Interoperability Specification (IOS) for High Rate Packet Data (HRPD) Radio Access Network Interfaces with Session Control in the Access Network. :A.S0008-C V2.0. Jan. 2009.
3GPP. $3^{rd}$ Generation Partnership Project: Technical Specification Group Services and System Aspects; Policy and charging control architecture, (Release 8), : TS 23.203 V8.8.0, Dec. 2009.
3GPP. $3^{rd}$ Generation Partnership Project; Technical Specification Group Core Network and Terminals; Proxy Mobile IPv6 (PMIPv6) based Mobility and Tunneling Protocol; Stage 3; (Release 8). 3GPP; TS 29.275 V8.5.0. Dec. 2009.
Carlson, J. et al. Point-to-Point Protocol (PPP) Vendor Protocol. IETF RFC 3772. May 2004.

* cited by examiner

*Primary Examiner* — Hassan Phillips
*Assistant Examiner* — Prenell Jones

(57) ABSTRACT

A UE and a method are described herein for optimizing a non-optimized handoff from a first access technology (e.g., E-TRAN, WiMAX, UMTS, WiFi, UMB and E-UTRAN) to a second access technology (e.g. 1×RTT, 1×EVDV, HRPD or eHRPD). In one embodiment, the "optimized" non-optimized handoff effectively decreases the mute time that is experienced by the UE during the handoff from the first access technology to the second access technology from around 628 ms to less than 500 ms which is a marked improvement.

20 Claims, 8 Drawing Sheets

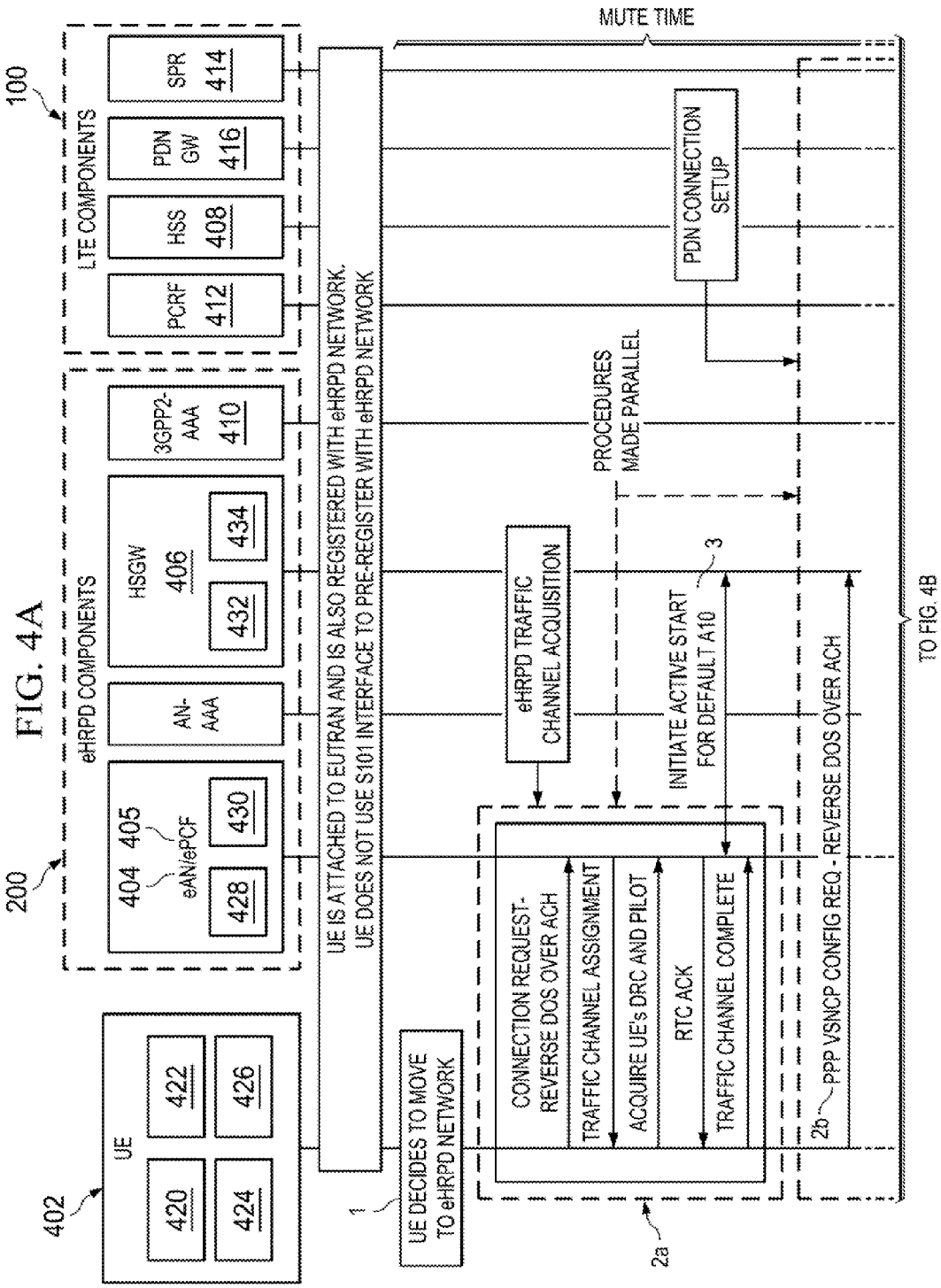

OPTIMIZATION OF NON-OPTIMIZED HANDOFF FROM A FIRST ACCESS TECHNOLOGY TO A SECOND ACCESS TECHNOLOGY

CLAIMING BENEFIT OF PRIOR FILED U.S. APPLICATION

This patent application claims the benefit of U.S. Application Ser. No. 61/297,443 filed on Jan. 22, 2010 the contents of which are hereby incorporated by reference herein.

TECHNICAL FIELD

The present invention relates in general to the wireless telecommunications field and, in particular, to a UE, other devices and methods for optimizing a non-optimized handoff from a first access technology (e.g., E-TRAN, WiMAX, UMTS, WiFi, UMB and E-UTRAN) to a second access technology (e.g. 1× RTT, 1× EVDV, HRPD or eHRPD). In one embodiment, the "optimized" non-optimized handoff effectively decreases the mute time that is experienced by the UE during the handoff from the first access technology to the second access technology from around 628 ms to less than 500 ms which is a marked improvement.

BACKGROUND

The following abbreviations are herewith defined, at least some of which are referred to within the following description of the prior art and the present invention.
1× EVDV 1× Evolution Data and Voice
1× RTT 1 times Radio Transmission Technology
AAA Authentication Authorization and Accounting
ACH Access Channel
APN Access Point Name
AN Access Network
AMBR Aggregate Maximum Bit Rate
AKA Authentication Key Agreement
BCM Bearer Control Mode
CC Control Channel
CDMA Code Division Multiple Access
DNS Domain Name System
DRC Data Rate Control
DOS Data over Signaling
eAN evolved Access Network
EAP Extensible Authentication Protocol
eHRPD evolved High Rate Packet Data
ePCF evolved Packet Control Function
E-TRAN Evolved Terrestrial Radio Access Network
E-UTRAN Evolved Universal Terrestrial Radio Access Network
HSGW Home Serving Gate Way
HSS Home Subscribber Server
IMSI International Mobile Subscriber Identity
IP Internet Protocol
IP-CAN IP Connectivity Access Network
LTE Long Term Evolution
NAI Network Access Identifier
NW Network
PBA Proxy Binding Acknowledgement
PBU Proxy Binding Update
PCRF Policy and Charging Rules Function
PCO Protocol Configuration Options
PDN Packet Data Network
P-GW PDN Gate Way
PPP Point to Point Protocol
QoS Quality of Service
RAN Radio Access Network
RFC Request For Comments
RTC Reverse Traffic Channel
SPR Subscription Profile Repository
TCH Traffic Channel
TS Technical Specifications
UE User Equipment
UMB Ultra Mobile Broadband
UMTS Universal Mobile Telecommunications System
VSNCP Vendor Specific Network Control Protocol LTE is a new radio access technology that will need to inter-work with the existing CDMA technology. FIG. 1 (PRIOR ART) is a block diagram illustrating an architecture of an E-UTRAN/EPC access network based on the new LTE radio access technology and an architecture of an eHRPD access network based on the existing CDMA radio access technology. Those skilled in the art are familiar with the architectures and functionalities of the E-UTRAN/EPC access network and the eHRPD access network. Thus, for clarity only the UE, eAN/PCF, HSGW, AN-AAA, PCRF, HSS, PDN-GW and SPR which happen to be relevant to the present discussion are described in detail herein while other well known components like the eNodeB, MME, Serving Gateway, HRPD BTS etc. are not described in detail within this document.

There are two handoff methods which currently exist today that can be used when a UE moves from the E-UTRAN/EPC access network (for example) based on the new LTE radio access technology to the eHRPD access network (for example) based on the existing CDMA radio access technology. The two handoff methods are known as the optimized handoff and the non-optimized handoff. The optimized handoff uses the S101 interface between the E-UTRAN access network and the eHRPD access network to allow the UE to establish and maintain the eHRPD radio session and HSGW context. This minimizes the delay (mute time) before the UE can send and receive packets after moving to the eHRPD access network. The non-optimized handoff generally requires the UE to establish an eHRPD radio session and HSGW context after moving to the eHRPD access network. However, it is possible that the HSGW already has partial context for the UE, which somewhat reduces the delay (mute time) before the UE can send and receive packets. These two types of non-optimized LTE-eHRPD handoffs are described in greater below in with respect to FIGS. 2-3 (PRIOR ART).

Referring to FIGS. 2A-2B (PRIOR ART), there is a signal flow diagram illustrating a non-optimized LTE-eHRPD active mode handover for the case when the eAN/ePCF and the HSGW have not saved any eHRPD context. The following messages or message sequences are exchanged in order to perform this type of non-optimized LTE-eHRPD active mode handover:

1. The UE is in an active mode while attached to E-UTRAN. Based on some trigger, the UE decides to perform cell reselection to eHRPD AN. The cell re-selection decision can be made at any time when the UE is attached in the E-UTRAN. The eNodeB may be involved in redirecting the UE to eHRPD.
2. The UE follows eHRPD procedures to establish a session with the eAN.
3. The UE, eAN and AN-AAA perform device level authentication procedures.
4. The UE acquires the necessary eHRPD resources to setup a traffic channel with the eAN.
5. The eAN/ePCF and HSGW exchange A11 messages to setup the default A10 (SO 59). The A11-RRQ contains the "tunneled mode indicator" set to '0' to indicate to the HSGW that the UE is operating on the eHRPD radio. If the "tunnel mode indicator" is not present, then the HSGW always assumes that the UE is operating on the eHRPD radio.
6. The UE and HSGW perform LCP negotiation and select EAP-AKA' as the authentication protocol.
7. The authentication procedures are initiated and performed involving the UE, the HSGW, the 3GPP2 AAA and the 3GPP AAA Server (not shown here). In the roaming case, there may be several AAA proxies involved. The PDN-GW address is determined at this point: The AAA/HSS sends subscription data to the HSGW. The subscription data contains the list of all APNs that the UE is permitted to access and an indication about which of those APNs is the Default APN. The subscription data also contains the NAI will be used to identify the UE in Proxy Binding Update and Gateway Control Session Establishment messages. This information is cached at the HSGW on behalf of the attaching UE. If the subscriber profile did not include an absolute PDN-GW address then a DNS look up may be performed to determine the PDN-GW address. At the end of this step, the Authentication phase is complete. Also, the HSGW has received the subscription profile of the UE from the HSS/AAA.
8. The UE sends a VSNCP Configure-Request to the HSGW. The UE makes the assumption that the HSGW has maintained partial context from the previous time that the UE had established context on eHRPD.
9. The HSGW may perform Gateway Control Session Establishment procedure with the PCRF. If performed, the HSGW indicates the possible bearer control modes according to the UE capability provided in step 7 and its own capability. The PCRF selects the bearer control mode to be used. The PCRF may also query the SPR to retrieve the subscriber profile.
10. The HSGW sends a Proxy Binding Update to the PDN-GW in order to establish the new registration as per 3GPP: TS 29.275 V.8.5.0 "Proxy Mobile IPv6 (PMIPv6) based Mobility and Tunneling Protocol; Stage 3; (Release 8)" December 2009 (the contents of which are incorporated herein by reference). The HSGW uses the NAI received in step 6 to identify the UE. If the VSNCP message in step 7 does not identify a requested APN, the HSGW will use the default APN acquired from HSS/AAA during Authentication and Authorization procedures to choose the PDN-GW. If the VSNCP message in step 7 identifies a requested APN that is authorized to the user, the HSGW will use that APN to choose the PDN-GW.
11. The PDN-GW performs a PCRF interaction to establish the IP-CAN session as per 3GPP: TS 23.203 V.8.8.0: "Policy and charging control architecture, (Release 8)" December 2009 (the contents of which are incorporated herein by reference).
12. The PDN-GW responds with a Proxy Binding Acknowledgement. PBA to the HSGW as discussed in 3GPP: TS 29.275.
13. The HSGW sends a VSNCP Configure-Ack (PDN-ID, APN, PDN Address, PCO, Attach Type, and Address Allocation Cause) message to the UE over the main service connection. The PDN Address Information may contain an IPv4 address for IPv4 and/or an IPv6 Interface Identifier for IPv6. Additional configuration options (e.g., IPv4 Default Router Address) are included if they are present in the Configure-Request. The Protocol Configuration Options parameter may be included to indicate the Selected Bearer Control Mode, if the Protocol Configuration Options parameter was included by the UE in the corresponding VSCNP Configure-Request and indicated support for NW Requested Bearer Control.
14. The HSGW sends a VSNCP Configure-Request message to complete the protocol specified in IETF RFC 3772: "PPP Vendor Protocol" May 2004 (the contents of which are incorporated herein by reference). The message includes the PDN-ID configuration option. This message also contains the APN-AMBR if received from the HSS/AAA.
15. The UE responds with a VSNCP Configure-Ack message. The UE includes APN-AMBR, if it received APN-AMBR in step 13 and if the UE supports APN-AMBR.
16. The UE, RAN (not shown), HSGW and PCRF proceed to re-establish dedicated bearers based on the Bearer Control Mode.
17. Dedicated bearer can now flow over the eHRPD network with the proper QoS.

Note: This type of non-optimized LTE-eHRPD active mode handover has a mute time of around 3075 ms for the UE initiated BCM and 3015 ms for the network initiated BCM.

Referring to FIGS. 3A-3B (PRIOR ART), there is a signal flow diagram illustrating a non-optimized LTE-eHRPD active mode handover for the case when the eAN/ePCF and the HSGW have saved at least partial eHRPD context. The highlighted areas 300a and 300b which include the following steps: (1) eHRPD session establishment; (2) device authentication (query IMSI); and (3) EAP over PPP based authentication have been eliminated from the handoff process due to a partial context of the UE being saved by the eAN/ePCF and the HSGW (compare to FIGS. 2A-2B). The following messages or message sequences are exchanged in order to perform this type of non-optimized LTE-eHRPD active mode handover:

1. The UE is in active mode and currently attached to E-UTRAN. Based on some trigger, the UE decides to perform cell reselection to eHRPD AN. The cell reselection decision can be made at any time when the UE is attached in the E-UTRAN. The eNodeB may be involved in redirecting the UE to eHRPD.
2. The UE acquires the necessary eHRPD resources to setup a traffic channel with the eAN.
3. The ePCF recognizes that the A10 session associated with the UE is available, and initiates an 'Active Start' to the HSGW.
4. The HSGW may retrieve the UE context from the HSS/AAA, including the IP address(es) of PDN-GW(s) currently in use by the UE.
5. The UE sends a VSNCP Configure-Request to the HSGW. The UE makes the assumption that the HSGW has maintained partial context from the previous time that the UE had established context on eHRPD.
6. The HSGW may perform Gateway Control Session Establishment procedure with the PCRF. If performed, the HSGW indicates the possible bearer control modes according to the UE capability provided in step 5 and its own capability. The PCRF selects the bearer control mode to be used. The PCRF may also query the SPR to retrieve the subscriber profile.
7. The HSGW sends a Proxy Binding Update to the PDN-GW to establish the new registration as per 3GPP: TS 29.275 V. 8.5.0: "Proxy Mobile IPv6 (PMIPv6) based Mobility and Tunneling Protocol; Stage 3; (Release 8)" December 2009 (the contents of which are incorporated herein by reference) The HSGW uses the NAI received in step 5 to identify the UE: If the VSNCP message in step 5 does not identify a requested APN, the HSGW will use the default APN acquired from HSS/AAA during Authentication and Authorization procedures to choose the PDN-GW. If the VSNCP message in step 5 identifies a requested APN that is authorized to the user, the HSGW will use that APN to choose the PDN-GW.

8. The PDN-GW performs a PCRF interaction to modify the IP-CAN session as per 3GPP: TS 23.203 V.8.8.0: "Policy and charging control architecture, (Release 8)" December 2009 (the contents of which are incorporated herein by reference).

9. The PDN-GW responds with a Proxy Binding Acknowledgement PBA to the HSGW as discussed in 3GPP: TS 29.275.

10. The HSGW sends a VSNCP Configure-Ack (PDN-ID, APN, PDN Address, PCO, Attach Type, and Address Allocation Cause) message to the UE over the main service connection. The PDN Address Information may contain an IPv4 address for IPv4 and/or an IPv6 Interface Identifier for IPv6. Additional configuration options (e.g., IPv4 Default Router Address) are included if they present in the Configure-Request. The Protocol Configuration Options parameter may be included to indicate the Selected Bearer Control Mode, if the Protocol Configuration Options parameter was included by the UE in the corresponding VSCNP Configure-Request and indicated support for NW Requested Bearer Control.

11. The HSGW sends a VSNCP Configure-Request message to complete the protocol specified in IETF RFC 3772: "PPP Vendor Protocol" May 2004 (the contents of which are incorporated herein by reference). The message includes the PDN-1D configuration option. This message also contains the APN-AMBR if received from the HSS/AAA.

12. The UE responds with a VSNCP Configure-Ack message. The UE includes APN-AMBR, if it received APN-AMBR in step 10 and if the UE supports APN-AMBR.

13. The UE, RAN (not shown), HSGW and PCRF proceed to re-establish dedicated bearers based on the Bearer Control Mode.

14. Dedicated bearer can now flow over the eHRPD network with the proper QoS.

Note: This type of non-optimized LTE-eHRPD active mode handover has a mute time of around 688 ms for the UE initiated BCM and 628 ms for the network initiated BCM.

Unfortunately, if the UE participates in either of these two types of non-optimized handoffs the user will experience a mute time of at least about 628 ms which is not suitable for voice and many data services. Accordingly, there has been a need and still is a need to address this shortcoming and other shortcomings associated with these two types of non-optimized handoffs. This need and other needs have been addressed by the present invention.

SUMMARY

An enhanced UE, eAN/ePCF, HSGW and corresponding methods for optimizing a non-optimized handoff from a first access technology (e.g., E-TRAN, WiMAX, UMTS, WiFi, UMB and E-UTRAN) to a second access technology (e.g. 1× RTT, 1×EVDV, HRPD or eHRPD) have been described in the independent claims of the present application. Advantageous embodiments of these devices and methods have been described in the dependent claims.

In one aspect of the present invention there is provided a method for performing a non-optimized handoff from a first network having a plurality of nodes based on a first access technology to a second network having a plurality of nodes based on a second access technology. In one embodiment, the method is implemented by a UE and includes the steps of: (a) initiating a traffic channel acquisition procedure by sending a connection request message as payload in a reverse DOS message to one of the nodes in the second network, wherein the traffic channel acquisition procedure involves setting-up a traffic channel between the UE and the one node in the second network; (b) initiating a PDN connection setup procedure by sending another configuration request message as payload in another reverse DOS message to another one of the nodes in the second network, wherein the another one node in the second network has maintained at least partial context for the UE from a previous time that the UE had established context on the second network; and (c) the sending of the connection request message to the one node in the second network and the sending of the another configuration request message to the another one node in the second network are performed concurrently such that the traffic channel acquisition procedure and the PDN connection setup procedure are performed in parallel which reduces a mute time experienced by the UE during the non-optimized handoff from the first network to the second network. An advantage of this non-optimized handoff is that it effectively decreases the mute time that is experienced by the UE during the handoff from around 628 ms to less than 500 ms which is a marked improvement for voice and some data services.

In another aspect of the present invention there is a UE which includes at least a transmitter and a receiver which are configured to take part in a non-optimized handoff from a first network having a plurality of nodes based on a first access technology to a second network having a plurality of nodes based on a second access technology. In one embodiment, the UE also includes: (a) a processor; and (b) a memory that stores processor-executable instructions where the processor interfaces with the memory and executes the processor-executable instructions to perform the following operations: (i) initiating a traffic channel acquisition procedure by instructing the transmitter to send a connection request message as payload in a reverse DOS message to one of the nodes in the second network, wherein the traffic channel acquisition procedure involves setting-up a traffic channel with the one node in the second network; (ii) initiating a PDN connection setup procedure by instructing the transmitter to send another configuration request message as payload in another reverse DOS message to another one of the nodes in the second network, wherein the another one node in the second network has maintained at least partial context for the UE from a previous time that the UE had established context on the second network; and (iii) the transmitter sends the connection request message to the one node in the second network and sends the another configuration request message to the another one node in the second network concurrently such that the traffic channel acquisition procedure and the PDN connection setup procedure are performed in parallel which reduces a mute time experienced during the non-optimized handoff from the first network to the second network. An advantage of this non-optimized handoff is that it effectively decreases the mute time that is experienced by the UE during the, handoff from around 628 ms to less than 500 ms which is a marked improvement for voice and some data services.

In yet another aspect of the present invention there is provided a system for performing a non-optimized handoff from a first access technology to a second access technology. In one embodiment, the system includes: (a) a first network having a plurality of nodes based on the first access technology; (b) a second network having a plurality of nodes based on the second access technology; (c) a UE in active mode and attached to the first network but moving to the second network, where the UE includes a processor and a memory that stores processor-executable instructions where the processor interfaces with the memory and executes the processor-executable instructions to perform the following operations: (i) initiating a traffic channel acquisition procedure by sending a connection request message as payload in a reverse DOS message to one of the nodes in the second network, wherein the traffic channel acquisition procedure involves setting-up a traffic channel with the one node in the second network; (ii) initiating a PDN connection setup procedure by sending another configuration request message as payload in another reverse DOS message to another one of the nodes in the second network, wherein the another one node in the second network has maintained at least partial context for the UE from a previous time that the UE had established context on the second network; and (iii) the sending of the connection request message to the one node in the second network and the sending of the another configuration request message to the another one node in the second network are performed concurrently such that the traffic channel acquisition procedure and the PDN connection setup procedure are performed in parallel which reduces a mute time experienced during the non-optimized handoff from the first network to the second network. An advantage of this non-optimized handoff is that it effectively decreases the mute time that is experienced by the UE during the handoff from around 628 ms to less than 500 ms which is a marked improvement for voice and some data services.

In still yet another aspect of the present invention there is provided an eAN which is configured to take part in a non-optimized handoff of a UE from a first network having a plurality of nodes based on a first access technology to a second network having a plurality of nodes including the eAN which are based on a second access technology. In one embodiment, the eAN includes: (a) a processor; and (b) a memory that stores processor-executable instructions where the processor interfaces with the memory and executes the processor-executable instructions to perform the following operations: (i) receiving, from the UE, a reverse DOS message which contains a connection request message; (ii) sending, to the UE, a traffic channel assignment; (iii) receiving, from the UE, a message including DRC and pilot information; (iv) sending, to the UE, a RTC acknowledgement; and (v) receiving, from the UE, a traffic channel setup message. An advantage of this non-optimized handoff is that it effectively decreases the mute time that is experienced by the UE during the handoff from around 628 ms to less than 500 ms which is a marked improvement for voice and some data services.

In yet another aspect of the present invention there is provided a HSGW which is configured to take part in a non-optimized handoff of a UE from a first network having a plurality of nodes based on a first access technology to a second network having a plurality of nodes including the HSGW which are based on a second access technology. In one embodiment, the HSGW includes: (a) a processor; and (b) a memory that stores processor-executable instructions where the processor interfaces with the memory and executes the processor-executable instructions to perform the following operations: (i) receiving, from the UE, a reverse DOS message which contains a connection request message; (ii) retrieving UE context information; (iii) establishing a new registration for the UE; (iv) marking a configuration acknowledgement message as DOS eligible; (v) sending the configuration acknowledgement message to the UE via an access node in the second network; (vi) marking a configuration request message as DOS eligible; (vii) sending the configuration request message to the UE via the access node in the second network; and (viii) receiving, from the UE via the access node, a configuration acknowledgment message. An advantage of this non-optimized handoff is that it effectively decreases the mute time that is experienced by the UE during the handoff from around 628 ms to less than 500 ms which is a marked improvement for voice and some data services.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 4A-4C is a signal flow diagram illustrating the optimization of the non-optimized LTE-eHRPD active mode handover for the case when the eAN/ePCF and the HSGW have saved at least partial eHRPD context in accordance with an embodiment of the present invention.

DETAILED DESCRIPTION

Figure 1:
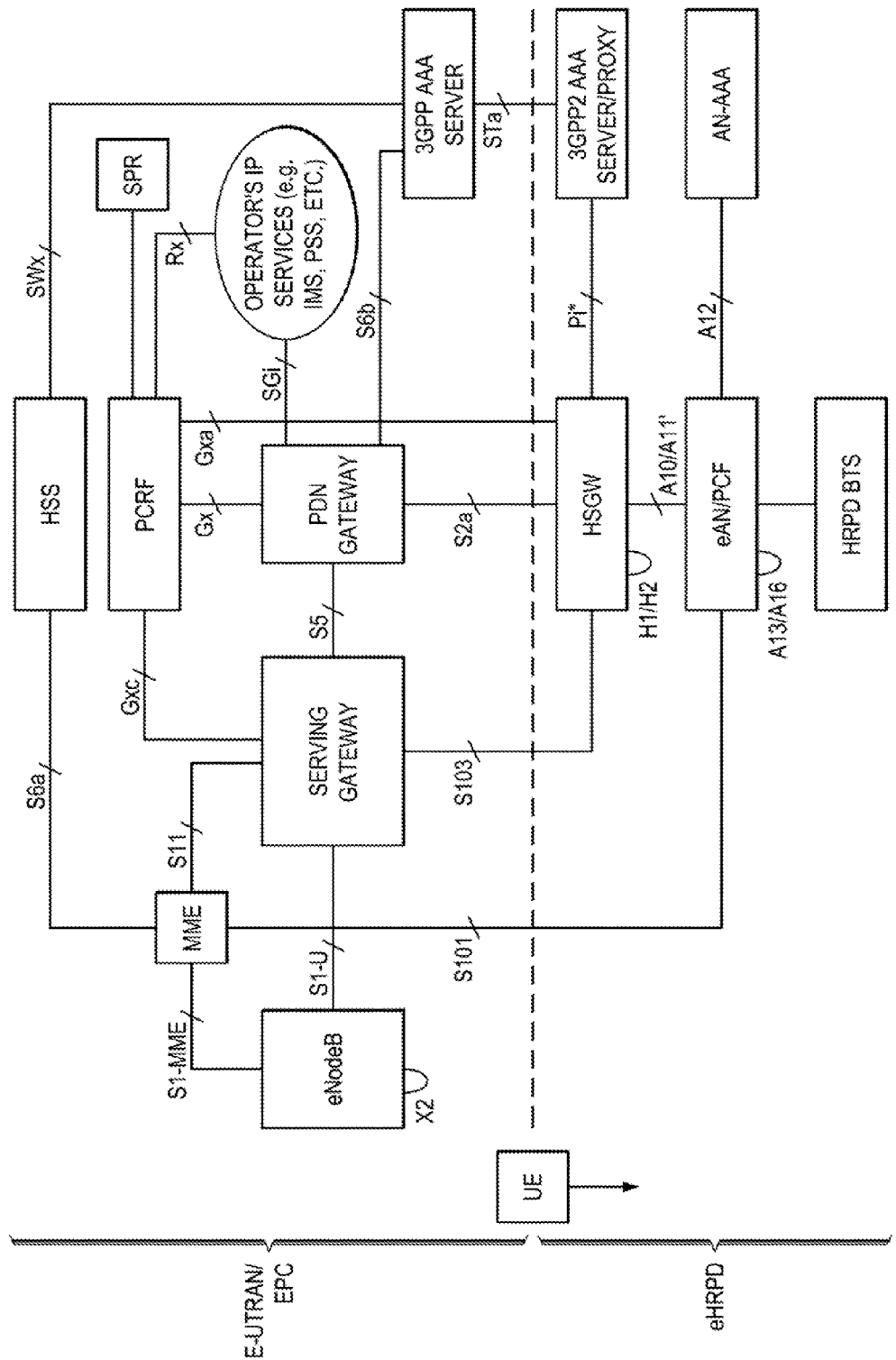
FIG. 1 (PRIOR ART) is a block diagram illustrating an architecture of an E-UTRAN/EPC access network based on the new LTE radio access technology and an architecture of an eHRPD access network based on the existing CDMA radio access technology.
Figure 2A:
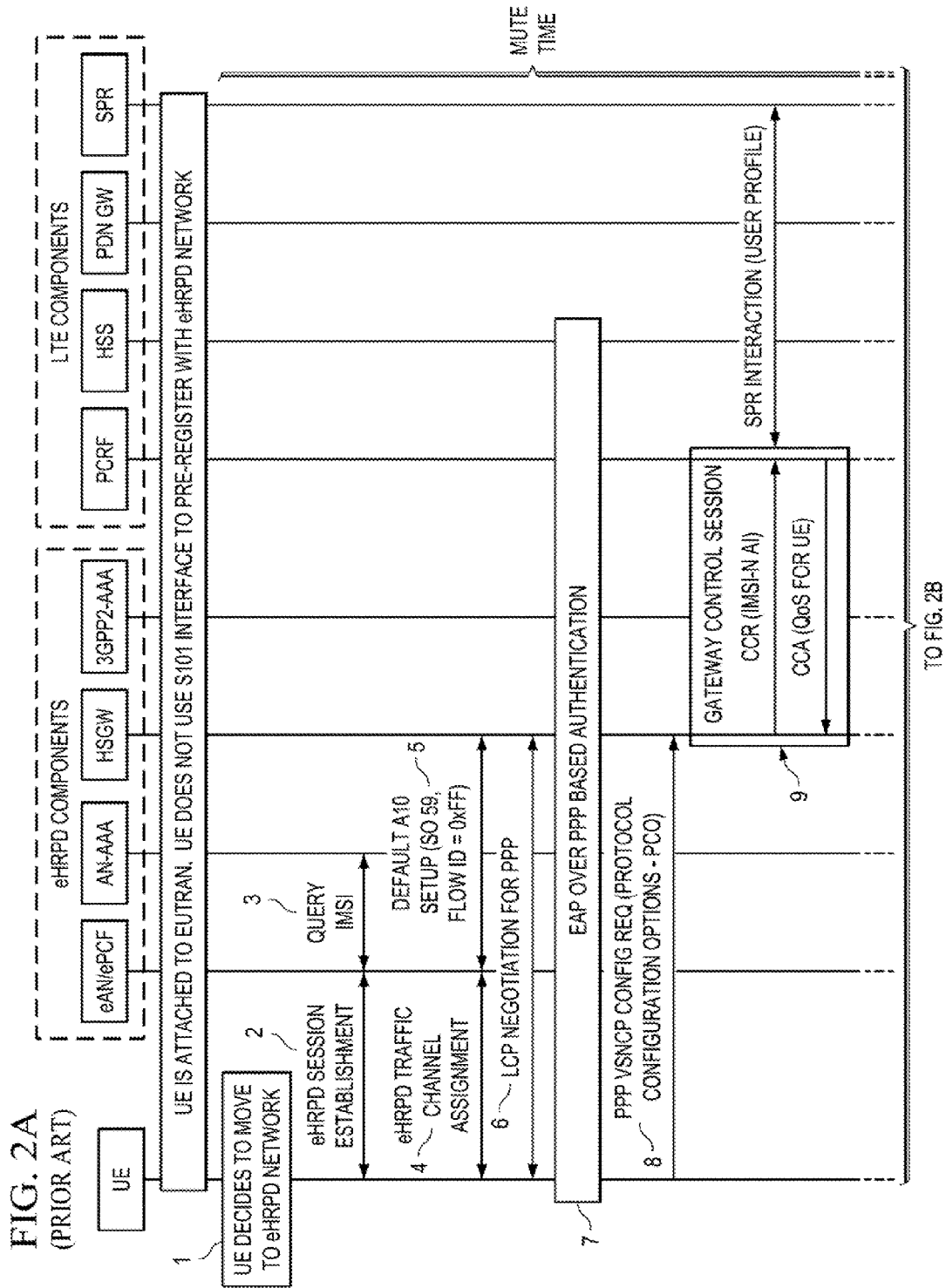
FIGS. 2A-2B (PRIOR ART) is a signal flow diagram illustrating a non-optimized LTE-eHRPD active mode handover for the case when the eAN/ePCF and the HSGW have not saved any eHRPD context.
Figure 2B:
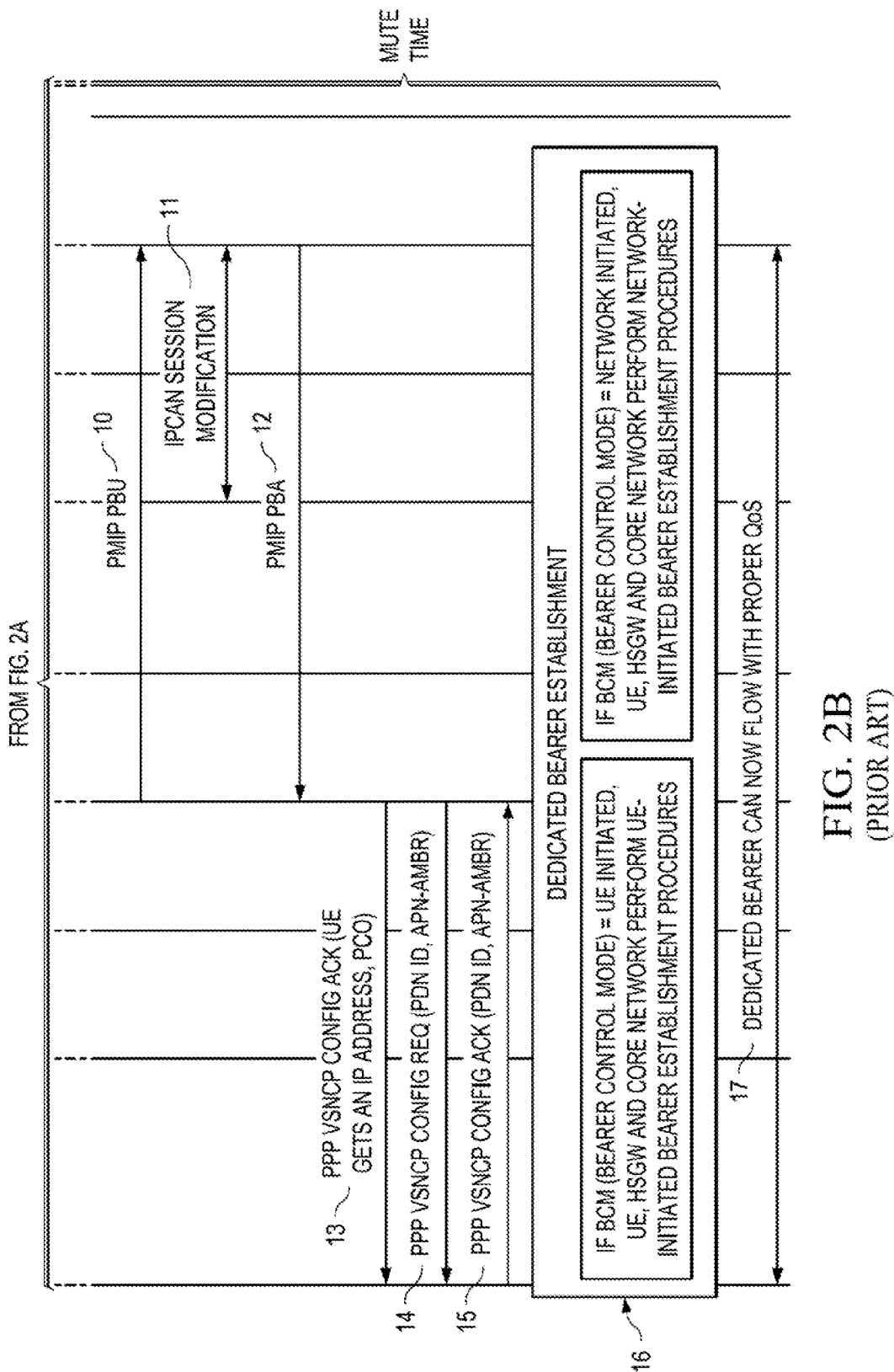
Figure 3A:
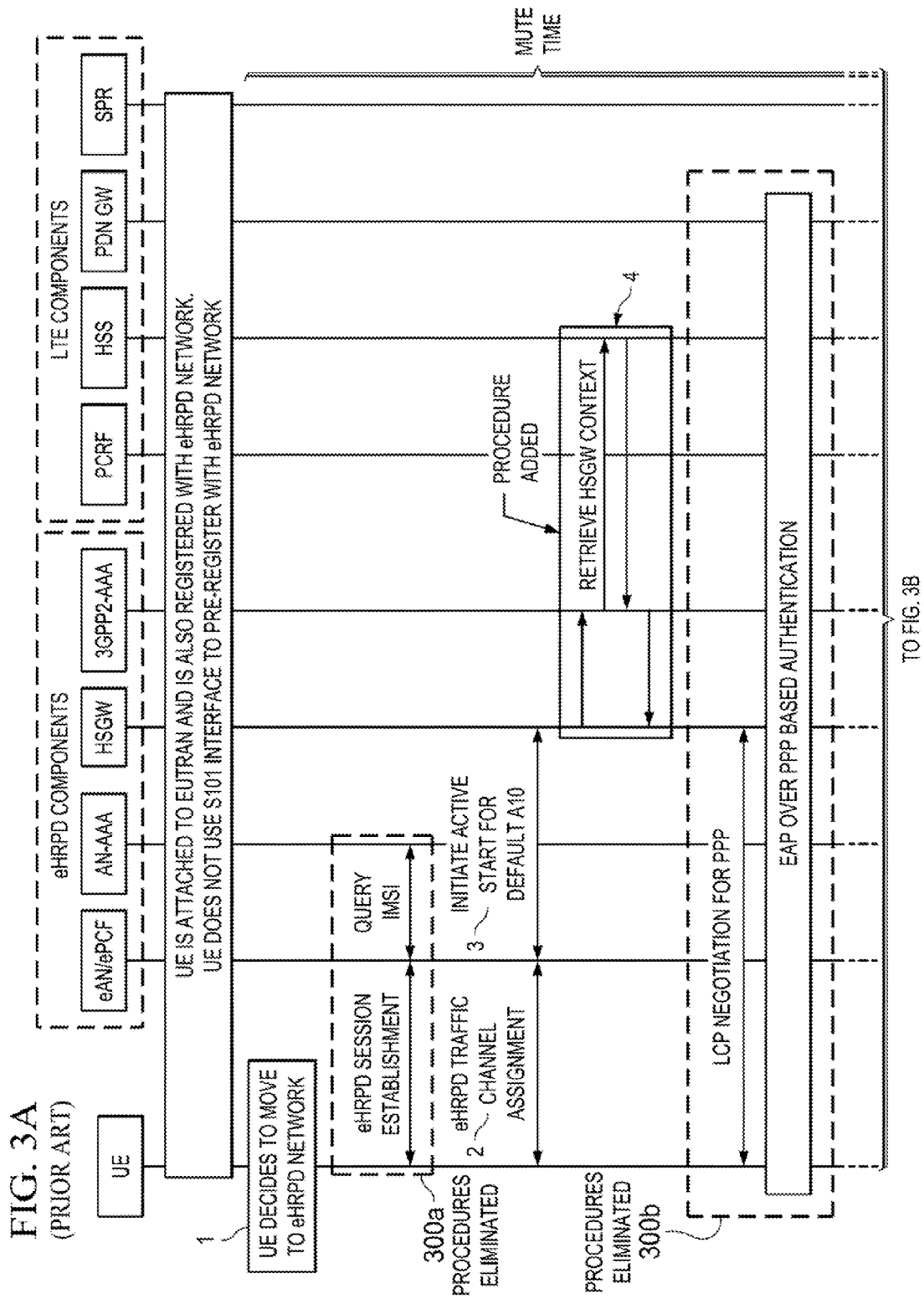
FIGS. 3A-3B (PRIOR ART) is a signal flow diagram illustrating a non-optimized LTE-eHRPD active mode handover for the case when the eAN/ePCF and the HSGW have saved at least partial eHRPD context.
Figure 3B:
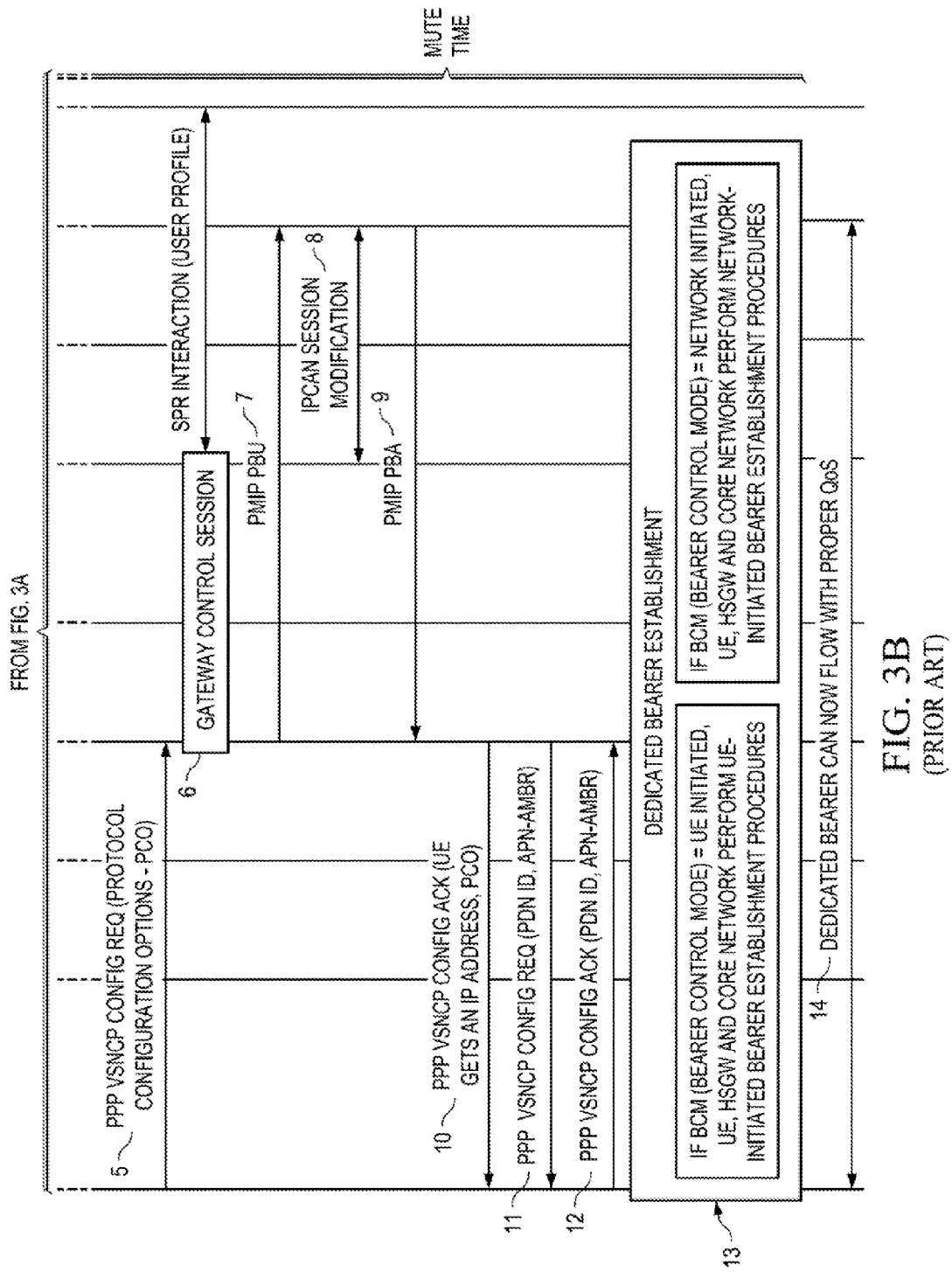
Figure 4B:
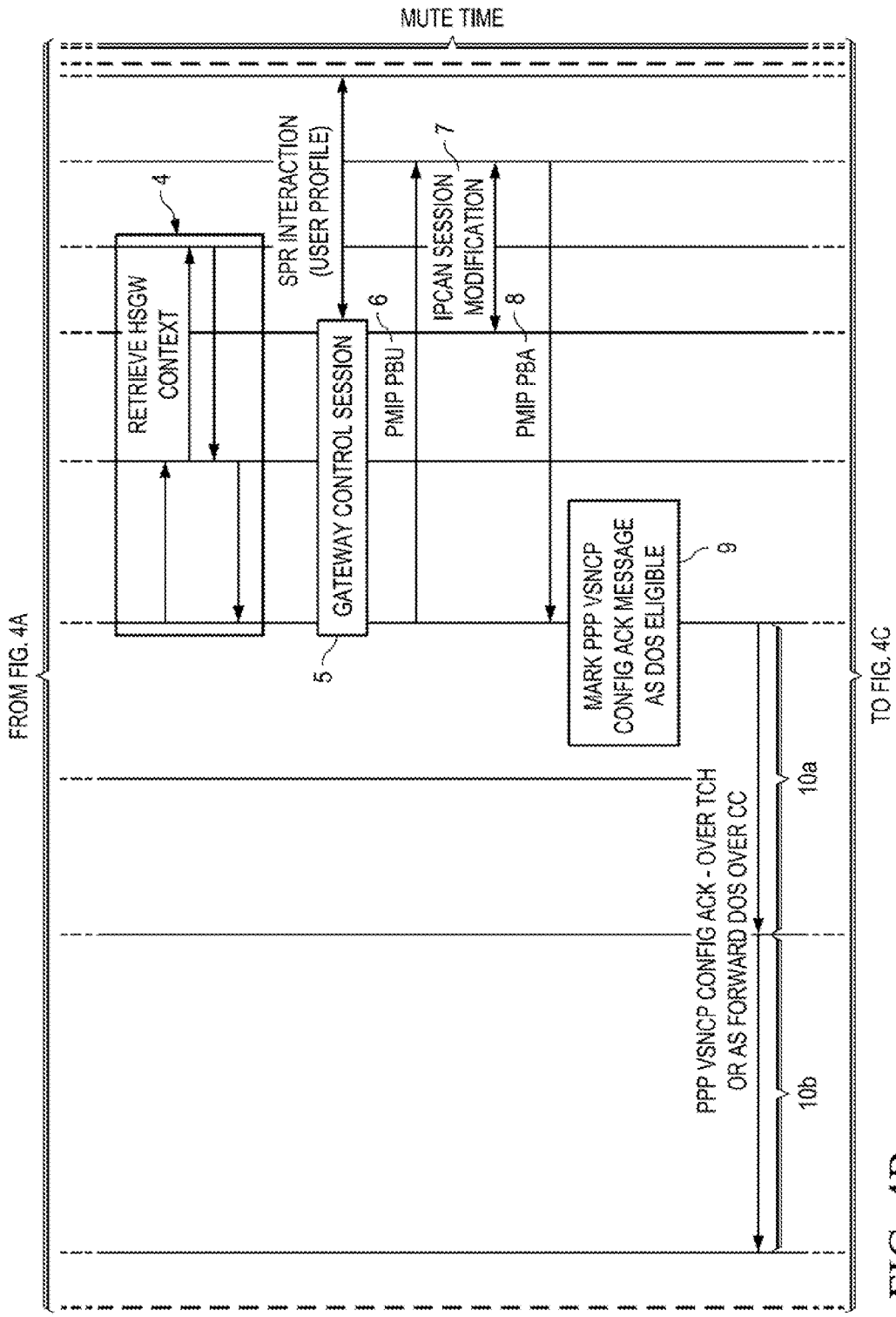
Figure 4C:
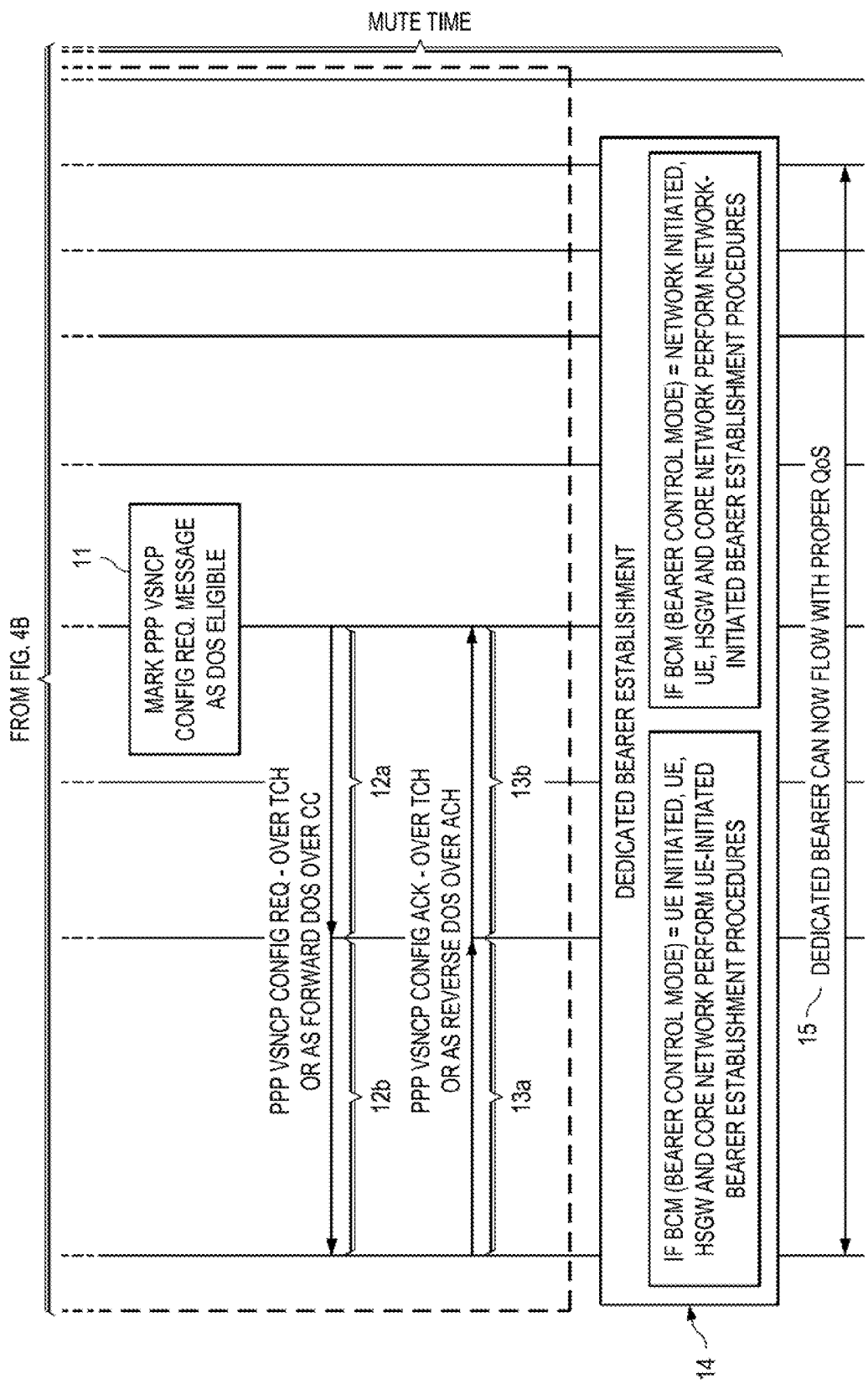

In the present invention, there is an enhanced UE 402, an enhanced eAN/ePCF 404, and an enhanced HSGW 406 which interact with at least one another to optimize the non-optimized handover by using the DOS (Data over Signaling) protocol to bring concurrency into the call setup signaling during the handoff. In one example, the enhanced UE 402, an enhanced eAN/ePCF 404, and an enhanced HSGW 406 use the DOS protocol for sending and receiving PPP VSNCP Config-Req and VSNCP Config-Ack messages to convert the traffic channel acquisition procedure and the PDN connection setup procedure which in the past had been sequential processes into parallel processes. The conversion of the traffic channel acquisition procedure and the PDN connection setup procedure into parallel processes effectively reduces the previous mute time of about 628 ms by at least 134 ms which is a marked improvement for voice and many data services. The following steps provide a brief summary about how the enhanced UE 402, the enhanced eAN/ePCF 404, and the enhanced HSGW 406 interact with one another to optimize the non-optimized handover in accordance with an embodiment of the present invention:

1. The UE 402 sends the PPP VSNCP Config-Req message using reverse DOS to initiate the PDN connection procedure while sending the Connection Request message to initiate the traffic channel acquisition procedure. Both of these messages can be bundled and transmitted over the ACH (Access Channel) (see steps 2a and 2b in FIG. 4A).
2. The HSGW 406 processes the PPP VSNCP Config-Req message as usual and then marks the PPP VSNCP Config-Ack message as a DOS eligible message before sending it to the eAN/ePCF 404/405 over the A10 interface (see steps 9-10a in FIG. 4B). Upon receiving the PPP VSNCP Config-Ack message from the HSGW 406, the eAN/ePCF 404/405 sends this message to the UE 402 using forward DOS over the CC (Control Channel) if the traffic channel has not been setup yet (see step 10b in FIG. 4B). If the traffic channel is set up, then the eAN/ePCF 404/405 sends this message over the TCH (see step 10b in FIG. 4B).
3. The HSGW 406 also marks the PPP VSNCP Config-Req message as a DOS eligible message before sending it to eAN/ePCF 404/405 over the A10 interface (see steps 11-12a in FIG. 4C). The eAN/ePCF 404/405, on the other hand, forwards this message to the UE 402 using forward DOS over the CC in absence of a traffic channel (see step 12b in FIG. 4C). If the traffic channel is set up, then the eAN/ePCF 404/405 sends this message over the TCH (see step 12b in FIG. 4C).
4. Upon receiving the PPP VSNCP Config-Req message from the HSGW 406, the UE 402 sends the PPP VSNCP Config-Ack message using the reverse DOS over ACH towards the HSGW 406 if the traffic channel is still unavailable (see steps 13a-13b in FIG. 4C). If the traffic channel is set up, then the eAN/ePCF 404/405 forwards this message over the TCH to the HSGW 406 (see steps 13a-13b in FIG. 4C).

Note: The maximum payload size of reverse DOS over the ACH (Access Channel) is 211 bytes while the maximum payload size of forward DOS over the CC (Control Channel) is 113 bytes. Thus, both the PPP VSNCP Config-Req message and the PPP VSNCP Config-Ack message which are expected to be fewer than 70 bytes can be easily be accommodated by the DOS protocol.

Referring to FIG. 4, there is a signal flow diagram illustrating the optimization of the non-optimized LTE-eHRPD active mode handover for the case when the eAN/ePCF and the HSGW have saved at least partial eHRPD context in accordance with an embodiment of the present invention. The following operations and messages or message sequences are exchanged in order to optimize the non-optimized LTE-eHRPD active mode handover:

1. The UE 402 is in active mode and currently attached to E-UTRAN. Based on some trigger, the UE 402 decides to perform cell reselection to eHRPD AN. The cell reselection decision can be made at any time when the UE 402 is attached in the E-UTRAN. The eNodeB may be involved in redirecting the UE 402 to eHRPD.

2a-2b. The UE 402 sends both the Connection Request (to initiate the traffic channel acquisition process) and the PPP VSNCP Config Req message (to initiate the PDN connection setup process) as a payload in reverse DOS messages over the ACH to the eAN 404 and the HSGW 406, respectively.

In step 2a, the UE 402 acquires the necessary eHRPD resources to setup a traffic channel with the eAN 404. In this example, the traffic channel acquisition process includes the following: (1) the sending of the Connection Request message by the UE 402; (2) sending of a Traffic Channel Assignment message by the eAN 404; (3) sending DRC and Pilot channels by the UE 402; (4) sending of a RTC Ack message by the eAN 404; and (5) sending a Traffic Channel Complete message by the UE 402. The traffic channel acquisition is a process by which the UE 402 changes its connection state from 'dormant' to 'active'. During the 'dormant' state, the UE 402 can not send or receive any bearer data to or from the eAN 404. During the 'active' state, on the other hand, the UE 402 has been allocated RF resources to send/receive data to/from the eAN 404.

In step 2b, the UE 402 sends a VSNCP Configure-Request to the HSGW 406. The UE 402 makes the assumption that the HSGW 406 has maintained partial context from the previous time that the UE 402 had established context on eHRPD. If this is not the case, then the eAN/ePCF 404 would set up the default A10 connection with the HSGW 406 as specified by 3GPP2:A.S0008-C v2.0: Interoperability Specification (IOS) for High Rate Packet Data (HRPD) Radio Access Network Interfaces with Session Control in the Access Network" January 2009 (the contents of which are incorporated herein by reference). In addition, the UE 402 would also go through the AKA authentication as specified by 3GPP2 X: S0057-0 Version 2.0: E-UTRAN-eHRPD Connectivity and Interworking: Core Network Aspects, December, 2009 (the contents of which are incorporated herein by reference).

3. The ePCF 405 recognizes that the A10 session associated with the UE 402 is available, and initiates an 'Active Start' to the HSGW 406. This is part of the accounting/billing process in order to mark the start time for the UE 402 to be on the traffic channel.

4. The HSGW 406 may retrieve the UE context from the HSS/AAA 408/410, including the IP address(es) of PDN-GW(s) currently in use by the UE 402.

5. The HSGW 406 may perform a Gateway Control Session Establishment procedure with the PCRF 412. If performed, the HSGW 406 indicates the possible bearer control modes according to the UE capability provided in step 2b (as specified in the aforementioned 3GPP2: X.S0057-0) and its own capability. The PCRF 412 selects the bearer control mode to be used. The PCRF 412 may also query the SPR 414 to retrieve the subscriber profile.

6. The HSGW 406 sends a Proxy Binding Update (PBU) to the PDN-GW 416 to establish the new registration as per 3GPP: TS 29.275 V.8.8.0: "'Proxy Mobile IPv6 (PMIPv6) based Mobility and Tunneling Protocol; Stage 3; (Release 8)" December 2009 (the contents of which are incorporated herein by reference). The HSGW 406 uses a NAI received in step 3 to identify the UE 402. If the VSNCP message in step 2b does not identify a requested APN, then the HSGW 406 uses the default APN acquired from HSS/AAA 408/410 during the Authentication and Authorization procedures to choose the PDN-GW 416. If the VSNCP message in step 2b identifies a requested APN that is authorized to the user, then the HSGW 406 uses that APN to choose the PDN-GW 416.

7. The PDN-GW 416 performs a PCRF interaction to modify the IP-CAN session as per 3GPP: TS 23.203 V.

8.8.0: "Policy and charging control architecture, (Release 8)" December 2009 (the contents of which are incorporated herein by reference).

8. The PDN-GW 416 responds with a Proxy Binding Acknowledgement (PBA) to the HSGW 406 as discussed in the aforementioned 3GPP: TS 29.275.

9. The HSGW 406 marks the VSNCP Configure-Ack message as DOS eligible before sending it to the UE 402 via the ePCF 405 (over the main service connection).

10a-10b. The HSGW sends a VSNCP Configure-Ack (PDN-ID, APN, PDN Address, PCO, Attach Type, and Address Allocation Cause) message to the UE 402 over the main service connection via the ePCF 405. The PDN Address Information may contain an IPv4 address for IPv4 and/or an IPv6 Interface Identifier for IPv6. Additional configuration options (e.g., IPv4 Default Router Address) are included if they are present in the Configure-Request. The Protocol Configuration Options parameter may be included to indicate the Selected Bearer Control Mode, if the Protocol Configuration Options parameter was included by the UE 402 in the corresponding VSCNP Configure-Request and indicated support for NW Requested Bearer Control.

11. The HSGW 406 marks the VSNCP Configure-Req message as DOS eligible before sending the marked message to the UE 402 via ePCF 405 (over the main service connection).

12a-12b. The HSGW 406 sends a VSNCP Configure-Request message to the UE 402 via the ePCF 405 to complete the protocol specified in IETF RFC 3772: "PPP Vendor Protocol" May 2004 (the contents of which are incorporated herein by reference). The message includes the PDN-ID configuration option. This message also contains the APN-AMBR if received from the HSS/AAA 408/410.

13a-13b. The UE 402 responds by sending a VSNCP Configure-Ack message to the HSGW 406 via the ePCF 405. The UE 402 includes APN-AMBR, if it received APN-AMBR in step 12a-12b and if the UE 402 supports APN-AMBR.

14. The UE 402, RAN (not shown), HSGW 406 and PCRF 412 proceed to re-establish dedicated bearers based on the, Bearer Control Mode. If the selected BCM indicates network-initiated QoS, then the relevant procedures are executed for each dedicated bearer (IP flow) that was setup on LTE. If the selected BCM indicates UE-initiated QoS, then the appropriate procedures are executed for each dedicated bearer (IP flow) that was setup on LTE that the UE 402 wishes to establish.

15. Dedicated bearer can now flow over the eHRPD network with the proper QoS.

Note: This optimization of the non-optimized LTE-eHRPD active mode handover has a mute time of around 554 ms for the UE initiated BCM and 494 ms for the network initiated BCM.

In view of the foregoing, one skilled in the art will appreciate that the enhanced UE 402, the enhanced eAN/ePCF 404, and the enhanced HSGW 406 interact with one another to optimize the non-optimized handover by using the DOS protocol to bring concurrency into the call setup signaling during the handoff. In aforementioned example, the enhanced UE 402, the enhanced eAN/ePCF 404, and the enhanced HSGW 406 used the DOS protocol for sending and receiving PPP VSNCP Config-Req and VSNCP Config-Ack messages to convert the traffic channel acquisition procedure and the PDN connection setup procedure into parallel processes which in the past had been sequential processes. The conversion of the traffic channel acquisition procedure and the PDN connection setup procedure into parallel processes reduces the mute time experienced by the user of the UE 402. Although the example described herein related to the non-optimized E-UTRAN to eHRPD handover one should appreciate that the present invention is also applicable when a UE moves from one network based on a first access technology (e.g., E-TRAN, WiMAX, UMTS, WiFi, UMB) to a second network based on a second access technology (e.g. 1× RTT, 1× EVDV, HRPD).

The present invention also provides the UE 402 which includes at least a transmitter 420 and a receiver 422 which are configured to take part in a non-optimized handoff from a first network 100 (e.g., E-TRAN, WiMAX, UMTS, WiFi, UMB and E-UTRAN) having a plurality of nodes based on a first access technology (e.g., LTE technology) to a second network 200 (e.g. 1× RTT, 1× EVDV, HRPD or eHRPD) having a plurality of nodes based on a second access technology (e.g., CDMA technology). In one example, UE 402 also includes: (a) a processor 424; and (b) a memory 426 that stores processor-executable instructions where the processor 424 interfaces with the memory 426 and executes the processor-executable instructions to perform the following operations: (i) initiating a traffic channel acquisition procedure by instructing the transmitter 420 to send a connection request message as payload in a reverse DOS message to one of the nodes (e.g., eAN 404) in the second network 200, wherein the traffic channel acquisition procedure involves setting-up a traffic channel with the one node in the second network 200; (ii) initiating a PDN connection setup procedure by instructing the transmitter 420 to send another configuration request message as payload in another reverse DOS message to another one of the nodes (e.g., HSGW 406) in the second network 200, wherein the another one node in the second network has maintained at least partial context for the UE from a previous time that the UE had established context on the second network 200; and (iii) the transmitter 420 sends the connection request message to the one node in the second network 200 and sends the another configuration request message to the another one node in the second network 200 concurrently such that the traffic channel acquisition procedure and the PDN connection setup procedure are performed in parallel which reduces a mute time experienced during the non-optimized handoff from the first network 100 to the second network 200.

Moreover, the present invention provides the eAN 404 which is configured to take part in a non-optimized handoff of the UE 402 from a first network 100 (e.g., E-TRAN, WiMAX, UMTS, WiFi, UMB and E-UTRAN) having a plurality of nodes based on a first to access technology (e.g., LTE technology) to a second network 200 (e.g. 1× RTT, 1× EVDV, HRPD or eHRPD) having a plurality of nodes including the eAN 404 based on a second access technology (e.g., CDMA technology). In one embodiment, the eAN 404 includes: (a) a processor 428; and (b) a memory 430 that stores processor-executable instructions where the processor 428 interfaces with the memory 430 and executes the processor-execitable instructions to perform the following operations: (i) receiving, from the UE 402, a reverse data over signaling, DOS, message which contains a connection request message; (ii) sending, to the UE 402, a traffic channel assignment; (iii) receiving, from the UE 402, a message including DRC and pilot information; (iv) sending, to the UE 402, a reverse traffic channel, RTC, acknowledgement; and (v) receiving, from the UE 402, a traffic channel setup message.

Furthermore, the present invention provides the HSGW 410 which is configured to take part in a non-optimized handoff of the UE 402 from a first network 100 (e.g., E-TRAN, WiMAX, UMTS, WiFi, UMB and E-UTRAN) having a plurality of nodes based on a first access technology (e.g., LTE technology) to a second network 200 (e.g. 1×RTT, 1×EVDV, HRPD or eHRPD) having a plurality of nodes including the HSGW 410 based on a second access technology. In one embodiment, the HSGW 410 includes: (a) a processor 432; and (b) a memory 434 that stores processor-executable instructions where the processor 432 interfaces with the memory 434 and executes the processor-executable instructions to perform the following operations: (i) receiving, from the UE 402, a reverse DOS message which contains a connection request message; (ii) retrieving UE context information; (iii) establishing a new registration for the UE 402; (iv) marking a configuration acknowledgement message as DOS eligible; (v) sending the configuration acknowledgement message to the UE 402 via an access node 404 in the second network; (vi) marking a configuration request message as DOS eligible; (vii) sending the configuration request message to the UE 402 via the access node 404 in the second network; and (viii) receiving, from the UE 402 via the access node 404, a configuration acknowledgment message.

Although several embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A method for performing a non-optimized handoff from a first network having a plurality of nodes based on a first access technology to a second network having a plurality of nodes based on a second access technology, the method implemented by a user equipment, UE, comprising the steps of:
   initiating a traffic channel acquisition procedure by sending a connection request message as payload in a reverse data over signaling, DOS, message to one of the nodes in the second network, wherein the traffic channel acquisition procedure involves setting-up a traffic channel between the UE and the one node in the second network;
   initiating a packet data network, PDN, connection setup procedure by sending another configuration request message as payload in another reverse DOS message to another one of the nodes in the second network, wherein the another one node in the second network has maintained at least partial context for the UE from a previous time that the UE had established context on the second network; and
   the sending of the connection request message to the one node in the second network and the sending of the another configuration request message to the another one node in the second network are performed concurrently such that the traffic channel acquisition procedure and the PDN connection setup procedure are performed in parallel which reduces a mute time experienced by the UE during the non-optimized handoff from the first network to the second network.

2. The method of claim 1, wherein the UE is in active mode and attached to the first network prior to initiating the traffic channel acquisition procedure and the PDN connection setup procedure in the second network.

3. The method of claim 1, wherein the UE upon sending of the connection request message to the one node in the second network continues to perform the traffic channel acquisition procedure by:

receiving a traffic channel assignment from the one node in the second network;
   sending a message to the one node in the second network to acquire data rate control, DRC, and pilot information;
   receiving a reverse traffic channel, RTC, acknowledgement from the one node in the second network; and
   completing a traffic channel setup with the one node in the second network.

4. The method of claim 1, wherein the UE upon sending the configuration request message to the another node in the second network continues to perform the PDN connection setup procedure by:

receiving a configuration acknowledgement message from the one node in the second network, where the one node received the configuration acknowledgement message which was marked as being DOS eligible from the another node in the second network;
   receiving a configuration request message from the one node in the second network, where the one node received the configuration request message which was marked as being DOS eligible from the another node in the second network; and
   sending a configuration acknowledgment message to the one node in the second network, where the one node forwards the configuration acknowledgment message to the another node in the second network.

5. The method of claim 4, wherein the UE receives the configuration acknowledgment message as payload in a forward DOS message sent over a control channel if the traffic channel has not yet been setup, while if the traffic channel has been setup then the UE receives the configuration acknowledgement message over the traffic channel.

6. The method of claim 4, wherein the UE receives the configuration request message as payload in a forward DOS message sent over a control channel if the traffic channel has not yet been setup, while if the traffic channel has been setup then the UE receives the configuration request message over the traffic channel.

7. The method of claim 4, wherein the UE sends the configuration acknowledgment message as payload in a reverse DOS message sent over a access channel if the traffic channel has not yet been setup, while if the traffic channel has been setup then the UE sends the configuration acknowledgement message over the traffic channel.

8. The method of claim 1, wherein the first access technology is one of the following: E-TRAN, WiMAX, UMTS, WiFi, UMB and E-UTRAN.

9. The method of claim 1, wherein the second access technology is packet based 1×RTT, 1×EVDV, HRPD or eHRPD.

10. A user equipment, UE, including at least a transmitter and a receiver which are configured to take part in a non-optimized handoff from a first network having a plurality of nodes based on a first access technology to a second network having a plurality of nodes based on a second access technology, the UE comprising:
    a processor; and
    a memory that stores processor-executable instructions where the processor interfaces with the memory and executes the processor-executable instructions to perform the following operations:
    initiating a traffic channel acquisition procedure by instructing the transmitter to send a connection request message as payload in a reverse data over signaling, DOS, message to one of the nodes in the second network, wherein the traffic channel acquisition procedure involves setting-up a traffic channel with the one node in the second network;

initiating a packet data network, PDN, connection setup procedure by instructing the transmitter to send another configuration request message as payload in another reverse DOS message to another one of the nodes in the second network, wherein the another one node in the second network has maintained at least partial context for the UE from a previous time that the UE had established context on the second network; and the transmitter sends the connection request message to the one node in the second network and sends the another configuration request message to the another one node in the second network concurrently such that the traffic channel acquisition procedure and the PDN connection setup procedure are performed in parallel which reduces a mute time experienced during the non-optimized handoff from the first network to the second network.

11. The UE of claim 10, wherein upon sending of the connection request message to the one node in the second network the processor further executes the processor-executable instructions to continue to perform the traffic channel acquisition procedure by:

receiving, at the receiver, a traffic channel assignment from the one node in the second network;

sending, from the transmitter, a message to the one node in the second network to acquire data rate control, DRC, and pilot information;

receiving, at the receiver, a reverse traffic channel, RTC, acknowledgement from the one node in the second network; and completing a traffic channel setup with the one node in the second network.

12. The UE of claim 10, wherein upon sending the configuration request message to the another node in the second network the processor further executes the processor-executable instructions to continue to perform the PDN connection setup procedure by:

receiving, at the receiver, a configuration acknowledgement message from the one node in the second network, where the one node received the configuration acknowledgement message which was marked as being DOS eligible from the another node in the second network;

receiving, at the receiver, a configuration request message from the one node in the second network, where the one node received the configuration request message which was marked as being DOS eligible from the another node in the second network; and sending, from the transmitter, a configuration acknowledgment message to the one node in the second network, where the one node forwards the configuration acknowledgment message to the another node in the second network.

13. The UE of claim 12, wherein the receiver receives the configuration acknowledgment message as payload in a forward DOS message sent over a control channel if the traffic channel has not yet been setup, while if the traffic channel has been setup then the receiver receives the configuration acknowledgement message over the traffic channel.

14. The UE of claim 12, wherein the receiver receives the configuration request message as payload in a forward DOS message sent over a control channel if the traffic channel has not yet been setup, while if the traffic channel has been setup then the receiver receives the configuration request message over the traffic channel.

15. The UE of claim 12, wherein the transmitter sends the configuration acknowledgment message as payload in a forward DOS message sent over a access channel if the traffic channel has not yet been setup, while if the traffic channel has been setup then the transmitter sends the configuration acknowledgement message over the traffic channel.

16. The UE of claim 10, wherein the first access technology is one of the following: E-TRAN, WiMAX, UMTS, WiFi, UMB and E-UTRAN.

17. The UE of claim 10, wherein the second access technology is packet based 1×RTT, 1×EVDV, HRPD or eHRPD.

18. A system for performing a non-optimized handoff from a first access technology to a second access technology, the system including:

a first network having a plurality of nodes based on the first access technology;

a second network having a plurality of nodes based on the second access technology;

a user equipment, UE, in active mode and attached to the first network but moving to the second network, where the UE includes:

a processor; and a memory that stores processor-executable instructions where the processor interfaces with the memory and executes the processor-executable instructions to perform the following operations:

initiating a traffic channel acquisition procedure by sending a connection request message as payload in a reverse data over signaling, DOS, message to one of the nodes in the second network, wherein the traffic channel acquisition procedure involves setting-up a traffic channel with the one node in the second network;

initiating a packet data network, PDN, connection setup procedure by sending another configuration request message as payload in another reverse DOS message to another one of the nodes in the second network, wherein the another one node in the second network has maintained at least partial context for the UE from a previous time that the UE had established context on the second network; and the sending of the connection request message to the one node in the second network and the sending of the another configuration request message to the another one node in the second network are performed concurrently such that the traffic channel acquisition procedure and the PDN connection setup procedure are performed in parallel which reduces a mute time experienced during the non-optimized handoff from the first network to the second network.

19. The system of claim 18, wherein the UE upon sending of the connection request message to the one node in the second network continues to perform the traffic channel acquisition procedure by:

receiving a traffic channel assignment from the one node in the second network;

sending a message to the one node in the second network to acquire data rate control, DRC, and pilot information;

receiving a reverse traffic channel, RTC, acknowledgement from the one node in the second network; and completing a traffic channel setup with the one node in the second network.

20. The system of claim 18, wherein the UE upon sending the configuration request message to the another node in the second network continues to perform the PDN connection setup procedure by:

receiving a configuration acknowledgement message from the one node in the second network, where the one node received the configuration acknowledgement message which was marked as being DOS eligible from the another node in the second network;

receiving a configuration request message from the one node in the second network, where the one node received the configuration request message which was marked as being DOS eligible from the another node in the second network; and sending a configuration acknowledgment message to the one node in the second network, where the one node forwards the configuration acknowledgment message to the another node in the second network.

* * * * *

UNITED STATES PATENT AND TRADEMARK OFFICE
CERTIFICATE OF CORRECTION

PATENT NO. : 8,553,647 B2  
APPLICATION NO. : 12/772456  
DATED : October 8, 2013  
INVENTOR(S) : Akhtar Page 1 of 1

It is certified that error appears in the above-identified patent and that said Letters Patent is hereby corrected as shown below:

In the Specification

In Column 1, Line 54, delete "Subscribber" and insert -- Subscriber --, therefor.

In Column 2, Line 46, delete "below in with" and insert -- below with --, therefor.

In Column 3, Line 13, delete "point:" and insert -- point. --, therefor.

In Column 10, Line 53, delete ""Proxy" and insert -- "Proxy --, therefor.

In Column 12, Line 49, delete "first to access" and insert -- first access --, therefor.

In Column 12, Line 56, delete "processor-execitable" and insert -- processor-executable --, therefor.

In Column 12, Lines 65-66, delete "HSGW 410" and insert -- HSGW 406 --, therefor.

In Column 13, Line 5, delete "HSGW 410" and insert -- HSGW 406 --, therefor.

In Column 13, Line 6, delete "HSGW 410" and insert -- HSGW 406 --, therefor.

In the Claims

In Column 14, Line 41, in Claim 7, delete "over a" and insert -- over an --, therefor.

In Column 15, Line 66, in Claim 15, delete "over a" and insert -- over an --, therefor.

Signed and Sealed this  
Twentieth Day of May, 2014

Michelle K. Lee  
*Deputy Director of the United States Patent and Trademark Office*